(12) United States Patent
Diwan

(10) Patent No.: US 8,543,901 B1
(45) Date of Patent: Sep. 24, 2013

(54) VERIFICATION OF CONTENT STORED IN A NETWORK

(75) Inventor: Arif Diwan, Cranston, RI (US)

(73) Assignee: Level 3 Communications, LLC, Broomfield, CO (US)

( * ) Notice: Subject to any disclaimer, the term of this patent is extended or adjusted under 35 U.S.C. 154(b) by 603 days.

(21) Appl. No.: 09/430,883

(22) Filed: Nov. 1, 1999

(51) Int. Cl.
*G06F 17/00* (2006.01)

(52) U.S. Cl.
USPC .......................................... 715/208

(58) Field of Classification Search
USPC .............. 715/501.1, 513, 205, 206–208, 234; 705/27; 709/218–223, 245; 713/178, 201; 345/738
See application file for complete search history.

(56) References Cited

U.S. PATENT DOCUMENTS

| | | |
|---|---|---|
| 4,495,570 A | 1/1985 | Kitajima et al. |
| 4,591,983 A | 5/1986 | Bennett et al. |
| 4,594,704 A | 6/1986 | Ollivier |
| 4,726,017 A | 2/1988 | Krum et al. |
| 4,803,641 A | 2/1989 | Hardy et al. |
| 4,839,798 A | 6/1989 | Eguchi et al. |
| 4,847,784 A | 7/1989 | Clancey |
| 4,920,432 A | 4/1990 | Eggers |
| 4,922,417 A | 5/1990 | Churm et al. |
| 4,943,932 A | 7/1990 | Lark et al. |
| 4,949,187 A | 8/1990 | Cohen |
| 4,949,248 A | 8/1990 | Caro |
| 5,029,232 A | 7/1991 | Nall |
| 5,130,792 A | 7/1992 | Tindell et al. |
| 5,132,992 A | 7/1992 | Yurt et al. |
| 5,136,716 A | 8/1992 | Harvey |
| 5,172,413 A | 12/1992 | Bradley |
| 5,191,573 A | 3/1993 | Hair |
| 5,253,275 A | 10/1993 | Yurt et al. |
| 5,253,341 A | 10/1993 | Rozmanith |
| 5,287,499 A | 2/1994 | Nemes |
| 5,287,537 A | 2/1994 | Newmark et al. |
| 5,291,554 A | 3/1994 | Morales |
| 5,341,477 A | 8/1994 | Pitkin et al. |
| 5,371,532 A | 12/1994 | Gelman et al. |
| 5,410,343 A | 4/1995 | Coddington |

(Continued)

FOREIGN PATENT DOCUMENTS

| | | |
|---|---|---|
| CA | 2202572 | 10/1998 |
| EP | 0800143 A | 10/1997 |

(Continued)

OTHER PUBLICATIONS

Cohen, Edith et al., Improving end-to-end performance of the Web using server volumes snd proxy filters; ACM Applications, Technologies, Architectures, and Protocols for Computer Communication, pp. 241-253. Sep. 1998.*

(Continued)

*Primary Examiner* — Adam M Queler

(57) ABSTRACT

The systems and methods described herein are useful for maintaining the integrity of documents, such as web pages, which contain hyperlinks to other documents, such as other web pages. A value representative of the content or a portion thereof of the document referenced by the hyperlink may be included in the hyperlink, such that changes in the content of the document are reflected as changes in the value representative thereof. Subsequent retrievals of the referenced document may then be analyzed to verify that the contents of the document have not been altered since the hyperlink was created.

28 Claims, 4 Drawing Sheets

(56) References Cited

U.S. PATENT DOCUMENTS

| | | | |
|---|---|---|---|
| 5,414,455 A | 5/1995 | Hooper | |
| 5,442,389 A | 8/1995 | Blahut | |
| 5,442,390 A | 8/1995 | Hooper | |
| 5,442,749 A | 8/1995 | Northcutt | |
| 5,471,622 A | 11/1995 | Eadline | |
| 5,475,615 A | 12/1995 | Lin | |
| 5,508,732 A | 4/1996 | Bottomley | |
| 5,515,511 A | 5/1996 | Nguyen | |
| 5,519,435 A | 5/1996 | Anderson | |
| 5,528,281 A | 6/1996 | Grady | |
| 5,539,621 A | 7/1996 | Kikinis | |
| 5,542,087 A | 7/1996 | Neimat et al. | |
| 5,544,313 A | 8/1996 | Shachnai | |
| 5,544,327 A | 8/1996 | Dan | |
| 5,550,577 A | 8/1996 | Verbiest | |
| 5,550,863 A | 8/1996 | Yurt | |
| 5,550,982 A | 8/1996 | Long | |
| 5,557,317 A | 9/1996 | Nishio | |
| 5,572,643 A | 11/1996 | Judson | |
| 5,590,288 A | 12/1996 | Castor | |
| 5,592,611 A | 1/1997 | Midgely | |
| 5,594,910 A | 1/1997 | Filepp et al. | |
| 5,603,026 A | 2/1997 | Demers et al. | |
| 5,606,609 A * | 2/1997 | Houser et al. | 713/179 |
| 5,619,648 A | 4/1997 | Canale | |
| 5,623,656 A | 4/1997 | Lyons | |
| 5,625,781 A | 4/1997 | Cline | |
| 5,627,829 A | 5/1997 | Gleeson et al. | |
| 5,630,067 A | 5/1997 | Kindell | |
| 5,633,999 A | 5/1997 | Clowes | |
| 5,634,006 A | 5/1997 | Baugher et al. | |
| 5,638,443 A | 6/1997 | Stefik et al. | |
| 5,644,714 A | 7/1997 | Kikinis | |
| 5,646,676 A | 7/1997 | Dewkett et al. | |
| 5,649,186 A | 7/1997 | Ferguson | |
| 5,659,729 A | 8/1997 | Nielsen | |
| 5,666,362 A | 9/1997 | Chen | |
| 5,671,279 A | 9/1997 | Elgamal | |
| 5,675,734 A | 10/1997 | Hair | |
| 5,682,512 A | 10/1997 | Tetrick | |
| 5,699,513 A | 12/1997 | Feigen et al. | |
| 5,712,979 A | 1/1998 | Graber et al. | |
| 5,715,453 A | 2/1998 | Stewart | |
| 5,721,914 A | 2/1998 | DeVries | |
| 5,734,831 A | 3/1998 | Sanders | |
| 5,740,423 A | 4/1998 | Logan et al. | |
| 5,742,762 A | 4/1998 | Scholl | |
| 5,751,961 A | 5/1998 | Smyk | |
| 5,761,507 A | 6/1998 | Govett | |
| 5,761,663 A | 6/1998 | Lagarde et al. | |
| 5,764,906 A | 6/1998 | Edelstein et al. | |
| 5,774,660 A | 6/1998 | Brendel et al. | |
| 5,774,668 A | 6/1998 | Choquier et al. | |
| 5,777,989 A | 7/1998 | McGarvey | |
| 5,784,058 A | 7/1998 | LaStrange et al. | |
| 5,794,257 A * | 8/1998 | Liu et al. | 707/501 |
| 5,796,952 A | 8/1998 | Davis et al. | |
| 5,799,141 A | 8/1998 | Galipeau et al. | |
| 5,802,106 A | 9/1998 | Packer | |
| 5,802,291 A | 9/1998 | Balick et al. | |
| 5,812,769 A | 9/1998 | Graber et al. | |
| 5,815,664 A | 9/1998 | Asano | |
| 5,828,847 A | 10/1998 | Gehr | |
| 5,832,506 A | 11/1998 | Kuzma | |
| 5,832,514 A | 11/1998 | Norin et al. | |
| 5,835,718 A | 11/1998 | Blewett | |
| 5,845,303 A | 12/1998 | Templeman | |
| 5,856,974 A | 1/1999 | Gervais et al. | |
| 5,862,339 A | 1/1999 | Bonnaure et al. | |
| 5,867,706 A | 2/1999 | Martin et al. | |
| 5,867,799 A | 2/1999 | Lang et al. | |
| 5,870,546 A | 2/1999 | Kirsch | |
| 5,870,559 A | 2/1999 | Leshem et al. | |
| 5,878,212 A | 3/1999 | Civanlar et al. | |
| 5,884,038 A | 3/1999 | Kapoor | |
| 5,890,171 A | 3/1999 | Blumer et al. | |
| 5,893,116 A | 4/1999 | Simmonds et al. | |
| 5,894,554 A | 4/1999 | Lowery et al. | |
| 5,896,533 A | 4/1999 | Ramos et al. | |
| 5,898,836 A * | 4/1999 | Freivald et al. | 709/218 |
| 5,903,723 A | 5/1999 | Beck et al. | |
| 5,907,704 A | 5/1999 | Gudmundson et al. | |
| 5,913,028 A | 6/1999 | Wang et al. | |
| 5,913,033 A | 6/1999 | Grout | |
| 5,918,010 A | 6/1999 | Appleman et al. | |
| 5,919,247 A | 7/1999 | Van Hoff et al. | |
| 5,920,701 A | 7/1999 | Miller et al. | |
| 5,933,832 A | 8/1999 | Suzuoka et al. | |
| 5,935,207 A | 8/1999 | Logue et al. | |
| 5,945,989 A | 8/1999 | Freishtat et al. | |
| 5,956,489 A | 9/1999 | San Andres et al. | |
| 5,956,716 A | 9/1999 | Kenner | |
| 5,958,008 A * | 9/1999 | Pogrebisky et al. | 709/223 |
| 5,961,596 A | 10/1999 | Takubo et al. | |
| 5,966,440 A | 10/1999 | Hair | |
| 5,968,121 A | 10/1999 | Logan et al. | |
| 5,978,791 A | 11/1999 | Farber et al. | |
| 5,983,214 A | 11/1999 | Lang et al. | |
| 5,983,227 A | 11/1999 | Nazem et al. | |
| 5,987,606 A | 11/1999 | Cirasole et al. | |
| 5,991,809 A | 11/1999 | Kriegsman | |
| 6,002,720 A | 12/1999 | Yurt et al. | |
| 6,003,030 A | 12/1999 | Kenner et al. | |
| 6,006,264 A | 12/1999 | Colby et al. | |
| 6,012,087 A * | 1/2000 | Freivald et al. | 709/218 |
| 6,012,090 A | 1/2000 | Chung et al. | |
| 6,014,686 A | 1/2000 | Elnozahy et al. | |
| 6,014,698 A | 1/2000 | Griffiths | |
| 6,018,516 A | 1/2000 | Packer | |
| 6,026,440 A | 2/2000 | Shrader et al. | |
| 6,029,141 A * | 2/2000 | Bezos et al. | 705/27 |
| 6,029,175 A | 2/2000 | Chow et al. | |
| 6,029,176 A | 2/2000 | Cannon | |
| 6,035,332 A | 3/2000 | Ingrassia, Jr. et al. | |
| 6,038,216 A | 3/2000 | Packer | |
| 6,038,310 A | 3/2000 | Hollywood et al. | |
| 6,038,610 A | 3/2000 | Belfiore et al. | |
| 6,041,324 A | 3/2000 | Earl et al. | |
| 6,044,405 A | 3/2000 | Driscoll, III et al. | |
| 6,046,980 A | 4/2000 | Packer | |
| 6,049,831 A | 4/2000 | Gardell et al. | |
| 6,052,718 A | 4/2000 | Gifford | |
| 6,052,730 A | 4/2000 | Felciano et al. | |
| 6,061,697 A * | 5/2000 | Nakao | 715/229 |
| 6,065,051 A | 5/2000 | Steele et al. | |
| 6,065,062 A | 5/2000 | Periasamy et al. | |
| 6,070,191 A | 5/2000 | Narendran et al. | |
| 6,081,829 A | 6/2000 | Sidana | |
| 6,092,112 A | 7/2000 | Fukushige | |
| 6,092,204 A | 7/2000 | Baker | |
| 6,105,028 A | 8/2000 | Sullivan et al. | |
| 6,108,673 A | 8/2000 | Brandt et al. | |
| 6,108,703 A * | 8/2000 | Leighton et al. | 709/226 |
| 6,112,231 A | 8/2000 | DeSimone et al. | |
| 6,112,239 A | 8/2000 | Kenner et al. | |
| 6,112,240 A | 8/2000 | Pogue et al. | |
| 6,115,357 A | 9/2000 | Packer et al. | |
| 6,115,752 A | 9/2000 | Chauhan | |
| 6,119,143 A | 9/2000 | Dias et al. | |
| 6,125,388 A | 9/2000 | Reisman | |
| 6,128,601 A | 10/2000 | Van Horne et al. | |
| 6,128,660 A | 10/2000 | Grimm et al. | |
| 6,130,890 A | 10/2000 | Leinwand et al. | |
| 6,134,583 A | 10/2000 | Herriot | |
| 6,144,375 A | 11/2000 | Jain et al. | |
| 6,144,702 A | 11/2000 | Yurt et al. | |
| 6,144,996 A | 11/2000 | Starnes et al. | |
| 6,151,624 A | 11/2000 | Teare et al. | |
| 6,154,738 A | 11/2000 | Call | |
| 6,154,744 A | 11/2000 | Kenner et al. | |
| 6,154,753 A | 11/2000 | McFarland | |
| 6,154,777 A | 11/2000 | Ebrahim | |
| 6,157,936 A * | 12/2000 | Mutschler, III et al. | 707/513 |
| 6,163,779 A | 12/2000 | Mantha et al. | |

| | | |
|---|---|---|
| 6,167,427 A | 12/2000 | Rabinovich et al. |
| 6,173,311 B1 | 1/2001 | Hassett et al. |
| 6,173,322 B1 | 1/2001 | Hu |
| 6,178,160 B1 | 1/2001 | Bolton et al. |
| 6,181,867 B1 | 1/2001 | Kenner et al. |
| 6,185,598 B1 | 2/2001 | Farber et al. |
| 6,185,619 B1 | 2/2001 | Joffe et al. |
| 6,189,030 B1 | 2/2001 | Kirsch et al. |
| 6,192,415 B1 * | 2/2001 | Haverstock et al. ........ 709/245 |
| 6,205,120 B1 | 3/2001 | Packer et al. |
| 6,225,995 B1 * | 5/2001 | Jacobs et al. ................ 345/738 |
| 6,226,642 B1 | 5/2001 | Beranek et al. |
| 6,230,196 B1 | 5/2001 | Guenthner et al. |
| 6,243,760 B1 | 6/2001 | Armbruster et al. |
| 6,247,133 B1 * | 6/2001 | Palage et al. ................ 713/201 |
| 6,249,810 B1 | 6/2001 | Kiraly |
| 6,256,675 B1 | 7/2001 | Rabinovich |
| 6,266,699 B1 | 7/2001 | Sevcik |
| 6,269,394 B1 | 7/2001 | Kenner et al. |
| 6,275,470 B1 | 8/2001 | Ricciulli |
| 6,282,569 B1 | 8/2001 | Wallis et al. |
| 6,282,574 B1 | 8/2001 | Voit |
| 6,286,045 B1 | 9/2001 | Griffiths et al. |
| 6,298,041 B1 | 10/2001 | Packer |
| 6,311,214 B1 | 10/2001 | Rhoads |
| 6,314,565 B1 | 11/2001 | Kenner et al. |
| 6,327,656 B2 * | 12/2001 | Zabetian ........................ 713/178 |
| 6,332,195 B1 | 12/2001 | Green et al. |
| 6,338,044 B1 | 1/2002 | Cook et al. |
| 6,347,085 B2 | 2/2002 | Kelly |
| 6,360,256 B1 | 3/2002 | Lim |
| 6,366,933 B1 * | 4/2002 | Ball et al. ................... 707/511 |
| 6,367,013 B1 * | 4/2002 | Bisbee et al. ................ 713/178 |
| 6,370,571 B1 | 4/2002 | Medin, Jr. |
| 6,370,580 B2 | 4/2002 | Kriegsman |
| 6,405,252 B1 | 6/2002 | Gupta et al. |
| 6,405,257 B1 | 6/2002 | Gersht et al. |
| 6,412,000 B1 | 6/2002 | Riddle et al. |
| 6,415,280 B1 | 7/2002 | Farber et al. |
| 6,421,726 B1 | 7/2002 | Kenner et al. |
| 6,430,618 B1 | 8/2002 | Karger et al. |
| 6,442,549 B1 | 8/2002 | Schneider |
| 6,456,630 B1 | 9/2002 | Packer et al. |
| 6,460,085 B1 | 10/2002 | Toporek et al. |
| 6,473,405 B2 | 10/2002 | Ricciulli |
| 6,480,893 B2 | 11/2002 | Kriegsman |
| 6,484,143 B1 | 11/2002 | Swildens et al. |
| 6,484,204 B1 | 11/2002 | Rabinovich |
| 6,490,580 B1 | 12/2002 | Dey et al. |
| 6,493,707 B1 | 12/2002 | Dey et al. |
| 6,496,856 B1 | 12/2002 | Kenner et al. |
| 6,502,125 B1 | 12/2002 | Kenner et al. |
| 6,502,215 B2 | 12/2002 | Raad et al. |
| 6,505,248 B1 | 1/2003 | Casper et al. |
| 6,529,477 B1 | 3/2003 | Toporek et al. |
| 6,553,413 B1 | 4/2003 | Leighton et al. |
| 6,553,420 B1 | 4/2003 | Karger et al. |
| 6,557,054 B2 | 4/2003 | Reisman |
| 6,564,251 B2 | 5/2003 | Katariya et al. |
| 6,577,595 B1 | 6/2003 | Counterman |
| 6,581,090 B1 | 6/2003 | Lindbo et al. |
| 6,584,083 B1 | 6/2003 | Toporek et al. |
| 6,591,299 B2 | 7/2003 | Riddle et al. |
| 6,611,862 B2 | 8/2003 | Reisman |
| 6,625,643 B1 | 9/2003 | Colby et al. |
| 6,654,344 B1 | 11/2003 | Toporek et al. |
| 6,654,807 B2 | 11/2003 | Farber et al. |
| 6,658,464 B2 | 12/2003 | Reisman |
| 6,665,706 B2 | 12/2003 | Kenner et al. |
| 6,665,726 B1 | 12/2003 | Leighton et al. |
| 6,691,148 B1 | 2/2004 | Zinky et al. |
| 6,694,358 B1 | 2/2004 | Swildens et al. |
| 6,699,418 B2 | 3/2004 | Okada et al. |
| 6,708,137 B2 | 3/2004 | Carley |
| 6,718,328 B1 | 4/2004 | Norris |
| 6,741,563 B2 | 5/2004 | Packer |
| 6,751,673 B2 | 6/2004 | Shaw |
| 8,754,699 | 6/2004 | Swildens et al. |
| 8,754,706 | 6/2004 | Swildens et al. |
| 6,763,388 B1 | 7/2004 | Tsimelzon |
| 6,778,502 B2 | 8/2004 | Ricciulli |
| 6,799,221 B1 | 9/2004 | Kenner et al. |
| 6,801,576 B1 | 10/2004 | Haldeman et al. |
| 6,834,306 B1 | 12/2004 | Tsimelzon |
| 6,842,604 B1 | 1/2005 | Cook et al. |
| 6,870,851 B1 | 3/2005 | Leinwand et al. |
| 6,874,032 B2 | 3/2005 | Gersht et al. |
| 6,901,604 B1 | 5/2005 | Kiraly |
| 6,915,329 B2 | 7/2005 | Kriegsman |
| 6,928,442 B2 | 8/2005 | Farber et al. |
| 6,934,255 B1 | 8/2005 | Toporek et al. |
| 6,950,623 B2 | 9/2005 | Brown et al. |
| 6,963,980 B1 | 11/2005 | Mattsson |
| 6,963,981 B1 | 11/2005 | Bailey et al. |
| 6,965,890 B1 | 11/2005 | Dey et al. |
| 6,970,432 B1 | 11/2005 | Hankins et al. |
| 6,973,485 B2 | 12/2005 | Ebata et al. |
| 6,973,490 B1 | 12/2005 | Robertson et al. |
| 6,981,050 B1 | 12/2005 | Tobias et al. |
| 6,981,180 B1 | 12/2005 | Bailey et al. |
| 6,996,616 B1 | 2/2006 | Leighton et al. |
| 7,003,572 B1 | 2/2006 | Lownsbrough et al. |
| 7,007,089 B2 | 2/2006 | Freedman |
| 7,010,578 B1 | 3/2006 | Lewin et al. |
| 7,012,900 B1 | 3/2006 | Riddle |
| 7,039,633 B1 | 5/2006 | Dey et al. |
| 7,047,300 B1 | 5/2006 | Oehrke et al. |
| 7,054,935 B2 | 5/2006 | Farber et al. |
| 7,058,706 B1 | 6/2006 | Iyer et al. |
| 7,069,177 B2 | 6/2006 | Carley |
| 7,096,266 B2 | 8/2006 | Lewin et al. |
| 7,103,645 B2 | 9/2006 | Leighton et al. |
| 7,181,523 B2 | 2/2007 | Sim |
| 2001/0029525 A1 | 10/2001 | Lahr |
| 2001/0056500 A1 | 12/2001 | Farber et al. |
| 2002/0018449 A1 | 2/2002 | Ricciulli |
| 2002/0023164 A1 | 2/2002 | Lahr |
| 2002/0023165 A1 | 2/2002 | Lahr |
| 2002/0040404 A1 | 4/2002 | Lahr |
| 2002/0042817 A1 | 4/2002 | Lahr |
| 2002/0046273 A1 | 4/2002 | Lahr et al. |
| 2002/0046405 A1 | 4/2002 | Lahr |
| 2002/0049857 A1 | 4/2002 | Farber et al. |
| 2002/0059592 A1 | 5/2002 | Kiraly |
| 2002/0066038 A1 | 5/2002 | Mattsson |
| 2002/0073199 A1 | 6/2002 | Levine et al. |
| 2002/0082999 A1 | 6/2002 | Lee et al. |
| 2002/0083124 A1 | 6/2002 | Knox et al. |
| 2002/0099850 A1 | 7/2002 | Farber et al. |
| 2002/0124080 A1 | 9/2002 | Leighton et al. |
| 2002/0129134 A1 | 9/2002 | Leighton et al. |
| 2002/0131645 A1 | 9/2002 | Hamilton |
| 2002/0143798 A1 | 10/2002 | Lisiecki et al. |
| 2002/0143888 A1 | 10/2002 | Lisiecki et al. |
| 2002/0147774 A1 | 10/2002 | Lisiecki et al. |
| 2002/0163882 A1 | 11/2002 | Bornstein et al. |
| 2002/0199016 A1 | 12/2002 | Freedman |
| 2003/0009444 A1 | 1/2003 | Eidler et al. |
| 2003/0018966 A1 | 1/2003 | Cook et al. |
| 2003/0028623 A1 | 2/2003 | Hennessey et al. |
| 2003/0028626 A1 | 2/2003 | Hennessey et al. |
| 2003/0028777 A1 | 2/2003 | Hennessey et al. |
| 2003/0055972 A1 | 3/2003 | Fuller et al. |
| 2003/0061263 A1 | 3/2003 | Riddle |
| 2003/0061280 A1 | 3/2003 | Bulson et al. |
| 2003/0078888 A1 | 4/2003 | Lee et al. |
| 2003/0078889 A1 | 4/2003 | Lee et al. |
| 2003/0105604 A1 | 6/2003 | Ash et al. |
| 2004/0022194 A1 | 2/2004 | Ricciulli |
| 2004/0139097 A1 | 7/2004 | Farber et al. |
| 2004/0177148 A1 | 9/2004 | Tsimelzon |
| 2005/0033858 A1 | 2/2005 | Swildens et al. |
| 2005/0038851 A1 | 2/2005 | Kriegsman |
| 2005/0100027 A1 | 5/2005 | Leinwand et al. |
| 2005/0114296 A1 | 5/2005 | Farber et al. |
| 2005/0262104 A1 | 11/2005 | Robertson et al. |
| 2006/0143293 A1 | 6/2006 | Freedman |

FOREIGN PATENT DOCUMENTS

| | | |
|---|---|---|
| EP | 0801487 A2 | 10/1997 |
| EP | 0817444 A2 | 1/1998 |
| EP | 0824236 A2 | 2/1998 |
| EP | 0865180 A2 | 9/1998 |
| GB | 2281793 | 3/1995 |
| JP | 07-066829 | 3/1995 |
| JP | 10-027148 | 1/1998 |
| JP | 10-093552 | 4/1998 |
| JP | 10-126445 | 5/1998 |
| JP | 10-171727 | 6/1998 |
| JP | 2001-053793 | 2/2001 |
| WO | WO 96 42041 | 12/1996 |
| WO | WO 97 11429 | 3/1997 |
| WO | WO 97 29423 | 8/1997 |
| WO | WO 98 04985 | 2/1998 |
| WO | WO 98 06033 | 2/1998 |
| WO | WO 99 09726 A | 2/1999 |
| WO | WO 99 29083 A | 6/1999 |
| WO | WO 99 40514 | 8/1999 |
| WO | WO 00 52594 A | 9/2000 |

OTHER PUBLICATIONS

Adler, R. M., "Distributed Coordination Models for Client/Server Computing," Computer 28, 4 (Apr. 1995), 14-22.

Andresen et al., "SWEB: Towards a Scalable World Wide Web Server on Multicomputers", Proc. IPPS, (Apr. 15, 1996), 850-856.

Andresen, D., et al., Multiprocessor scheduling with client resources to Improve the response time of WWW applications, Proc. 11th Intl Conf. on Supercomputing (Austria, Jul. 1997). ICS '97. ACM Press, NY, NY, 92-99.

Basturk, E., et al., "Using network layer anycast for load distribution in the Internet", Tech. Rep., IBM T.J. Watson Research Center, 1997 (21 pgs.).

Berners-Lee et al., RFC 1738—"Uniform Resource Locators (URL)", University of Minnesota, Dec. 1994, 1-25.

Bestavros, A., "Speculative Data Dissermination and Service to Reduce Server Load, Network Traffic and Service Time in Distributed Information Systems", In Proc. ICDE '96: The 1996 Int'l Conf. on Data Engineering, (Mar. 1996), 4 pages.

Bestavros, et al., "Server-Initiated Document Dissemination for the WWW," IEEE Data Engineering Bulletin 19(3):3-11, Sep. 1996, 1-8.

Bhattacharjee et al., "Application-layer anycasting," in Proc. IEEE INFOCOM '97, 1997, 1-9.

Braun, H., et al., "Web traffic characterization: an assessment of the impact of caching documents from NCSA's web server", Comput. Netw. ISDN Syst. 28, 1-2 (Dec. 1995), 37-51.

Brisco, T. P. RFC 1794: DNS support for load balancing, Apr. 1995, 1-7.

Carter et al., "Dynamic server selection using bandwidth probing in wide-area networks," Tech. Rep. BU-CS-96-007, Comp. Sci. Dept., Boston University, Mar. 1996, 1-20.

Carter et al., Server selection using dynamic path characterization in Wide-Area Networks, IEEE INFOCOM '97, (pp. 1014-1021), 1997, 1-8.

Carter, J. Lawrence et al., "Universal Classes of Hash Functions", Journal of Computer and System Sciences, vol. 18, No. 2, 143-154 (Apr. 1979), 106-112.

Chankhunthod, A. et al., "A Hierarchical Internet Object Cache", Proc. of the 1996 USENIX Technical Conf., Jan. 1996, pp. 153-163.

Cisco Systems, Inc., Cisco DistributedDirector 4700-M Installation and Configuration Guide, pp. xix-xxii; 1-1 to 1-14; 7-1 to 7-18, 8-1 to 8-20; pub. date unknown, [downloaded Apr. 2007 from http://www.cisco.com/univercd/cc/td/doc/product/iaabu/distrdir/dd4700m/].

Cisco Systems, Inc., Cisco DistributedDirector 2500 Series Installation and Configuration Guide, pp. xix-xxii; 1-1 to 1-12; 6-1 to 6-18; 7-1 to 7-18; 8-1 to 8-24, pub. date unknown, downloaded Apr. 2007: http://www.cisco.com/univercd/cc/td/doc/product/iaabu/distrdir/dd2501/.

Cisco Systems, Inc., "Cisco Distributed Director" http://www.cisco.com/warp/public/751/distdir/dd_wp.htm, 1997, 16 pages.

Cohen, J., et al., "Cache Array Routing Protocol v1.1", Sep. 29, 1997; http://tools.ietf.org/id/draft-vinod-carp-v1-01.txt (Last-Modified: Wed, Oct. 1, 1997), 8 pages.

Colajanni, M. and Yu, P. S. 1997. "Adaptive TTL schemes for load balancing of distributed Web servers. SIGMETRICS" Perform. Eval. Rev. 25, 2 (Sep. 1997), 36-42.

"Content Management Technology/Industry News," Content Technologies Trends and Advice, Gilbane Report, News for Jun. 1999 [21 pages].

Cormen, T. H., et al., "Introduction to Algorithms", The MIT Press, Cambridge, Massachusetts, (1990), 219-243, 991-993.

Crovella et al., "Dynamic server selection in the Internet", 3rd IEEE Workshop on the Arch. and Implementation of High Performance Computer Sys. '95, pp. 158-162, Aug. 1995.

Thaler, D. G. and Ravishankar, C. V. 1998. "Using name-based mappings to increase hit rates". IEEE/ACM Trans. Netw. 6, 1 (Feb. 1998), 1-14.

Danzig, P. B., et al., An analysis of wide-area name server traffic: a study of the Internet Domain Name System, Conf. Proc. Communications Architectures & Protocols (Aug. 1992). D. Oran, Ed. SIGCOMM '92. ACM Press, New York, NY, 281-292.

De Bra, P.M.E., et al., "Information Retrieval in the World Wide Web: Making Client-Based Searching Feasible", Computer Networks and ISDN Systems, NL, North Holland Publishing, Amsterdam, vol. 27, No. 2, ISSN: 0169-7552, (Nov. 1, 1994), 183-192.

Deering, S. E., et al, "Multicast routing in datagram internetworks and extended LANs," ACM Trans. Comput. Syst. 8, 2 (May 1990), 85-110.

Devine, R., "Design and Implementation of DDH: A Distributed Dynamic Hashing Algorithm", In Proc. 4th Int'l, Conf. on Foundations of Data Organizations and Algorithms, (1993), 101-114.

Doi, K. "Super Proxy Script—How to make distributed proxy servers by URL hashing," Sharp Corp., http://naragw.sharp.co.jp/sps/, dates unknown (1996-2000), download Jul. 7, 2007.

"Exporting Web Server Final Report," http://www.cs.technion.ac.il/Labs/Lccn/projects/spring97/project4/final_report.html, Spring 1997 (downloaded Jul. 7, 2007).

Feeley, M., et al., "Implementing Global Memory Management in a Workstation Cluster", In Proc. 15th ACM Symp. on Operating Systems Principles, (1995), 201-212.

Floyd, S., et al., "A Reliable Multicast Framework for Light-Weight Sessions and Application Level Framing", In Proc. of ACM SIGCOMM '95, 342-356, Aug. 1995.

Fox, A., "A Framework for Separating Server Scalability and Availability from Internet Application Functionality", PhD thesis, University of California, Berkeley, 1998, 163 pages.

Fox, A., et al,, "Cluster-based scalable network services", Proc. 16th ACM Symp. on Operating Systems Principles (Saint Maio, France, Oct. 5-8, 1997). W. M. Waite, Ed. SOSP '97. ACM Press, New York, NY, 78-91.

Fredman, M., et al., "Storing a Sparse Table with 0(1) Worst Case Access Time", J. ACM, vol. 31, No. 3, (Jul. 1984), 538-544.

Goldszmidt, et al., "Load Distribution for Scalable Web Servers: Summer Olympics 1996—A Case Study," In Proc. 8th IFIP/IEEE Int'l Workshop on Distributed Systems: Operations and Management, Sydney, Australia, Oct. 1997, 10 pages.

Grigni, M., et al., "Tight Bounds on Minimum Broadcasts Networks", SIAM J. Disc. Math. 4 (1991), 207-222, (1991) 25 pages.

Gulbrandsen, A., et al., "A DNS RR for specifying the location of services"(DNS SRV), Network Working Group, RFC 2052, Oct. 1996, 1-10.

Guyton et al., "Locating nearby copies of replicated Internet servers," Proc. ACM SIGCOMM '95, pp. 288-298, 1995, 1-18.

Gwertzman, J., et al., "The Case for Geographical Push-Caching", Proc. Workshop on Hot OS '95, (May 4, 1995), 51-55.

Gwertzman, J., et al., "World-Wide Web Cache Consistency", Proc. 1996 USENIX Tech. Conf., pp. 141-151, San Diego, CA, Jan. 1996, 11 pages.

IBM Technical Disclosure Bulletin,"Local Area Network Server Replacement Procedure", vol. 38, No. 1, (Jan. 1995), 235-236.

Jeffrey et al., Proxy-Sharing Proxy Servers, IEEE, pp. 116-119, 1996, 1-4.

Karger, D., et al., "Consistent Hashing and Random Trees: Distributed Caching Protocols for Relieving Hot Spots on the World Wide Web", in Proc. 29th Annual ACM Symp. on Theory of Computing, (May 1997), 654-663.

Kwan et al., NCSA's World Wide Web Server: Design and Performance, IEEE, pp. 68-74, Nov. 1995, 1-23.

Schemers, R., "Ibnamed—A load balancing name server written in Perl," 1995 LISA IX Sep. 17-22, 1995 Monterey, CA, 1-12.

Litwin, W., et al., "LH*—A Scalable, Distributed Data Structure", ACM Trans. on Database Systems, vol. 21, No. 4, pp. 480-525, 1996, 1-43.

Luotonen et al., World-Wide Web Proxies, CERN, Apr. 1994 (modified May 24, 1994), 1-8.

Malpani, R., et al., "Making World Wide Web Caching Servers Cooperate", In Proc. 4th Int'l. World Wide Web Conf. (Dec. 1995), 10 pages (downloaded from http://www.w3.org/Conferences/WWW4/Papers/59/ on Jul. 7, 2007), 10 pages.

Panigrahy, R., "Relieving Hot Spots on the World Wide Web", Master's thesis, MIT EECS, Jun. 1997, pp. 1-66.

Mockapetris et al., "Development of the Domain Name System," Proc. SIGCOMM '88 Computer Communications Review, vol. 18, No. 4, Aug. 1988, 112-122.

Mockapetris, P., RFC 1034: Domain Names—Concepts and Facilities, Nov. 1987, 1-55.

Mockapetris, P., RFC 1035: Domain Names—Implementation and Specification, Nov. 1987, 1-55.

Mourad et al., "Scalable Web Server Architectures," iscc, 2nd IEEE Symposium on Computers and Communications (ISCC '97), 1997, 12-16.

Nisan, N. 1990. Pseudorandom generators for space-bounded computations. In Proc. 22nd Annual ACM Symp. on theory of Computing (Baltimore, MD, U.S., May 13-17, 1990). H. Ortiz, Ed. STOC '90. ACM Press, New York, NY, 204-212.

Oguchi et al., A Study of Caching Proxy Mechanisms Realized on Wide Area Distributed Networks, High Performance Distributed Computing, 5th Int'l Symposium, 1996 443-449.

Palmer, M., et al., "Fido: A Cache that Learns to Fetch", In Proc. the 17th Intl Conf. on Very Large Data Bases, (Sep. 1991), 255-264.

Peleg, D., et al., "The Availability of Quorum Systems", Information and Computation, 123, 210-223, (1995), 31 pages.

Peterson, Eric, "Cisco Takes Global Route", PC Week News, (Feb. 17, 1997), p. 23.

Petri S., et al., "Load Balancing and Fault Tolerance in Workstation Clusters. Migrating Groups of Communicating Processes.", Operating Systems Review, vol. 29, No. 4, Oct. 1995, 25-36.

Plaxton, G. C., et al., "Fast Fault-Tolerant Concurrent Access to Shared Objects", In Proc. 37th IEEE Symp. of Foundations of Computer Science, 570-579, (1996), 10 pages.

J. Postel, "Domain Name System Structure and Delegation", RFC 1591; Mar. 1994 1-7.

Rabin, M. O., 1989, "Efficient dispersal of information for security, load balancing, and fault tolerance", J. ACM 36, 2 (Apr. 1989), 335-348.

Ross, K.W., "Hash-Routing for Collections of Shared Web Caches", IEEE Network Magazine, 11, 7:37-44, Nov.-Dec. 1997, 1-21.

Schuba, Christoph; "Addressing Weaknesses in the Domain Name System Protocol," COAST Laboratory, Dept. of Computer Sciences, Purdue University; West Layfayette, IN; Aug. 1993, p. 1-87.

Neil Smith, "What can Archives offer the World Wide Web?", Technical Report 11, University of Kent, Computing Laboratory, University of Kent, Canterbury, UK, 1994, 1-12.

Tarjan, Robert E., et al., "Storing a Sparse Table", Commun.ACM, 22, 11, (Nov. 1979), 606-611.

Vitter, J. S., et al., "Optimal Prefetching via Data Compression," Proc. 32nd Annual IEEE Symposium on Foundations of Computer Science (Oct. 1991), 21 pages.

Vixie, Paul; "Name Server Operations Guide for BIND," Internet Software Consortium; La Honda, CA; p. SMM:10-2-SMM:10-30 (undated, 1996), 1-30.

Jeff Walsh, "Global IP/PX Service Should Keep Network Delays Down", Infoworld, (Jan. 20, 1997), 1-2.

Duane Wessels, "Intelligent Caching for World-Wide Web Objects", Masters Thesis, University of Colorado, 1995, 1-84.

Yao, A. C. 1981. "Should Tables Be Sorted?". J. ACM 28, 3 (Jul. 1981), 615-628.

* cited by examiner

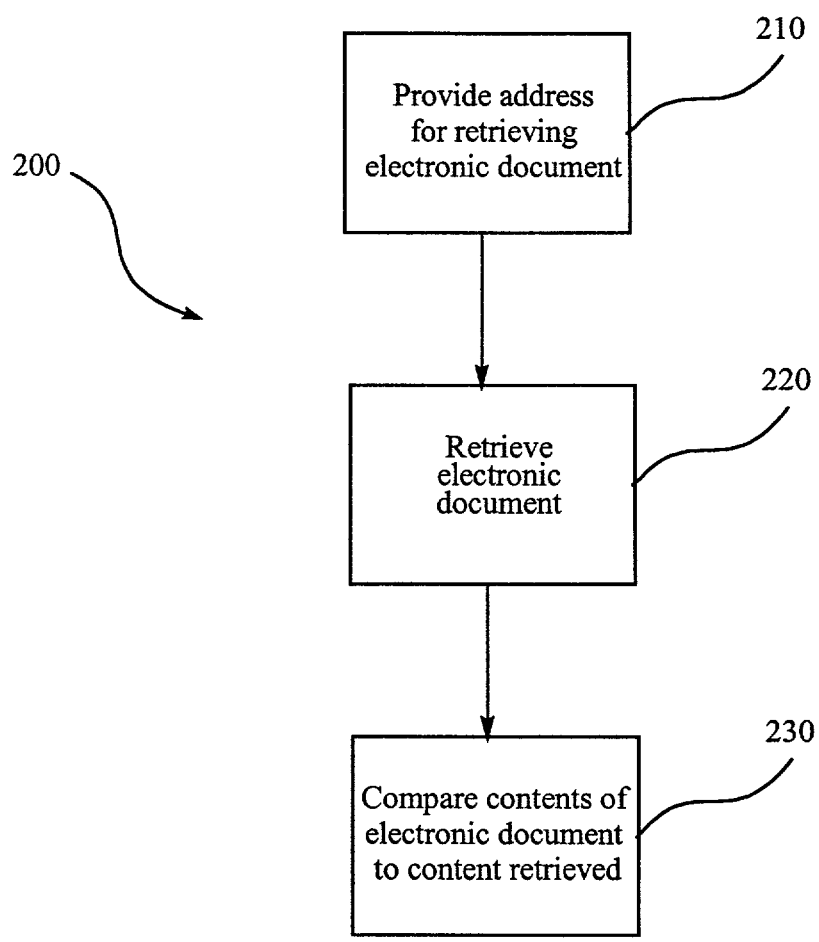

VERIFICATION OF CONTENT STORED IN A NETWORK

BACKGROUND OF THE INVENTION

1. Field of the Invention

This application relates to the field of document storage and retrieval, more particularly to the field of hyperlink authoring.

2. Description of the Prior Art

The recent proliferation of Internet web sites has put a tremendous amount of information at the fingertips of anyone with a web browser. Many web sites are made up of a number of pages, each of which includes several links to other web pages, both within the web site and in other web sites, where more information can be found, or another topic can be investigated. These links, or hyperlinks, simplify navigation through the Internet and allow information to be managed in discrete chunks.

However, the fluidity with which the Internet adapts by adding, removing, or modifying web pages makes the maintenance of hyperlinks difficult. For example, a web page may include a hyperlink to a page that is subsequently deleted, making the hyperlink defective. Alternatively, the content of the referenced page may be altered, possibly in a way that affects the interpretation of the referencing page. Such an alteration may be confusing for the reader or embarrassing for the creator of the web site. Although the creator may regularly check the hyperlinks to verify that the referenced sites are still suitable, such a task can become quite time-consuming for large web sites, and is furthermore prone to overlook small changes, which may in fact have large consequences. Currently, it is difficult, if not impossible, to adequately assure the integrity of hyperlinks in a document. For example, as stated in *Proposed Technical Standards and Guidelines for Electronic Filing in the United States Courts* at http:www.cohasset.comklec_filing/printable.html, current protocol specifically prohibits hyperlinks in electronic filings because of these problems.

SUMMARY OF THE INVENTION

The systems and methods described herein are useful for creating hyperlinks capable of verifying that the content of the referenced document has not been altered, e.g., is the same as the content of the document at the time the hyperlink was created. Thus, in one aspect, disclosed herein is a hyperlink including an address of an electronic document, and a value representative of the contents of said electronic document at a predetermined time. The electronic document may be a web-based document or any other document containing a hyperlink. In certain embodiments, the value is a digitally signed value.

In another embodiment, the systems and methods described herein provide a hyperlink including means for retrieving an electronic document, and means for comparing the contents of the retrieved document to the contents of the document at a predetermined time.

In another aspect, disclosed herein is a method for creating a self-verifying hyperlink by providing an electronic document accessible at an address, determining a value representative of the contents of the electronic document, and creating a hyperlink which includes the address and the value. In certain embodiment, the method also includes digitally signing the value. In certain embodiments, creating a hyperlink includes coupling a URL address with the value.

In yet another aspect, disclosed herein is a system for monitoring the contents of electronic documents, including an address for retrieving an electronic document coupled to a value representative of the contents of a predetermined version of the electronic document, a retrieval system for obtaining a current version of the electronic document at the address, a processor for calculating a value representative of the current version of the electronic document, and a comparator for comparing the value representative of the predetermined version with the value representative of the current version to determine if the electronic document has been modified. In certain embodiments, the value representative of the predetermined version is a digitally signed value. In certain embodiments, the address is a URL address.

In another embodiment, disclosed herein is a system for verifying the contents of an electronic document, including means for locating an electronic document coupled to a value representative of the contents of the document at a predetermined time, means for retrieving the electronic document, means for generating a value representative of the contents of the retrieved document, and means for comparing the value representative of contents of the retrieved document with the value representative of the contents of the document at a predetermined time to determine if the document has been altered since the predetermined time.

In still another aspect, disclosed herein is a method for verifying the contents of an electronic document by providing an address for retrieving an electronic document coupled to a value representative of the contents of the electronic document at a predetermined time, retrieving the electronic document from the address, determining a value for the retrieved document, and comparing the determined value with the value representative of the contents of the electronic document at the predetermined time to determine if the document has been modified since the predetermined time. In certain embodiments, providing an address includes providing a URL address, or providing an address for retrieving an electronic document coupled to a digitally signed value representative of the contents of the electronic document at a predetermined time.

In yet another aspect, disclosed herein is a web page including a hyperlink as described herein.

In another aspect, disclosed herein is system for verifying the contents of an electronic document having a retrieval system for obtaining an electronic document stored at an address, a processor for calculating a value representative of a retrieved document using a predetermined formula, and a comparator for comparing the value representative of the retrieved document with a value representative of a document previously retrieved from the address to verify that the values are identical.

In still another aspect, disclosed herein is a self-verifying hyperlink, comprising an address of an electronic document, a value representative of the contents of said electronic document at a predetermined time, and instructions for determining a value representative of the contents of the electronic document. In certain embodiments, the instructions are capable of being executed by a processor.

BRIEF DESCRIPTION OF THE FIGURES

The following figures depict certain illustrative embodiments of the invention in which like reference numerals refer to like elements. These depicted embodiments are to be understood as illustrative of the invention and not as limiting in any way.

FIG. 5 illustrates a method for verifying the contents of a document retrieved using a self-verifying hyperlink according to the present invention.

DETAILED DESCRIPTION OF THE ILLUSTRATED EMBODIMENTS

The description below pertains to several possible embodiments of the invention. It is understood that many variations of the systems and methods described herein may be envisioned by one skilled in the art, and such variations and improvements are intended to fall within the scope of the invention. Accordingly, the invention is not to be limited in any way by the following disclosure of certain illustrative embodiments.

Figure 1:
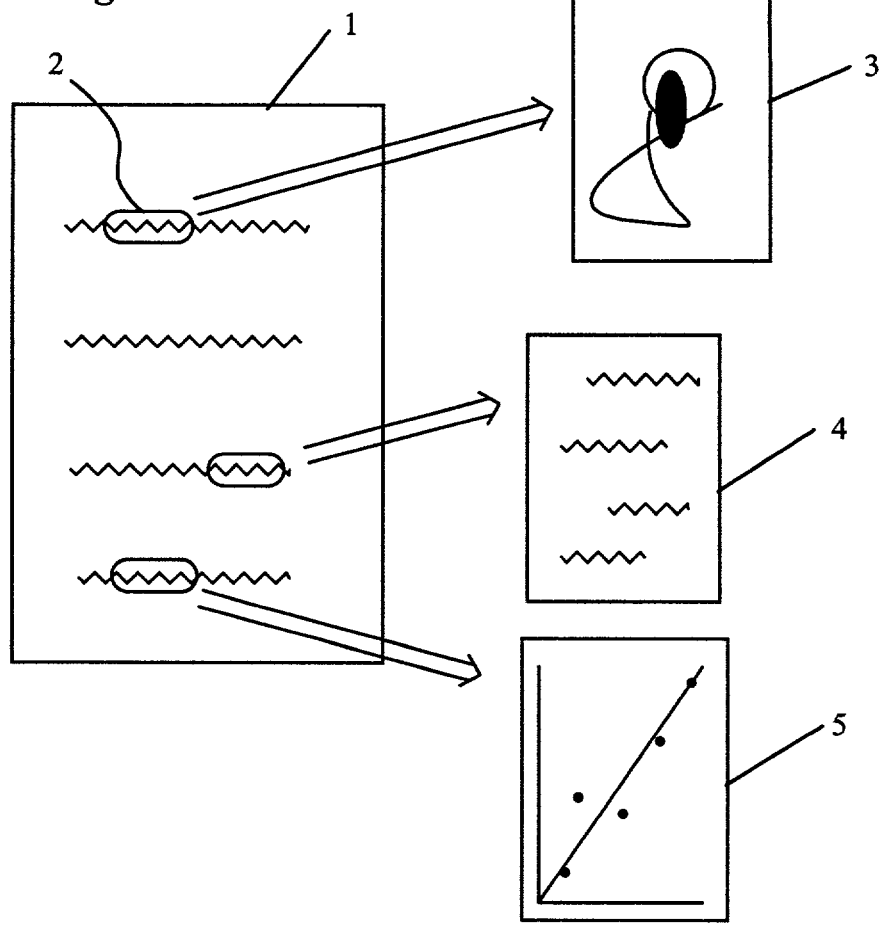
FIG. 1 illustrates a document containing hyperlinks which reference other electronic documents.
Figure 2:
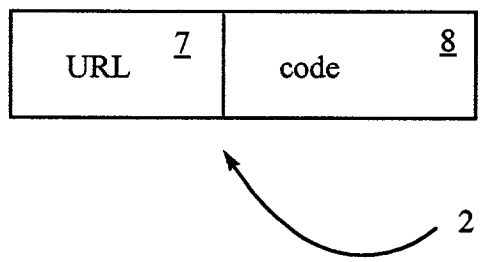
FIG. 2 presents one possible structure of a self-verifying hyperlink according to the present invention.
Figure 3:
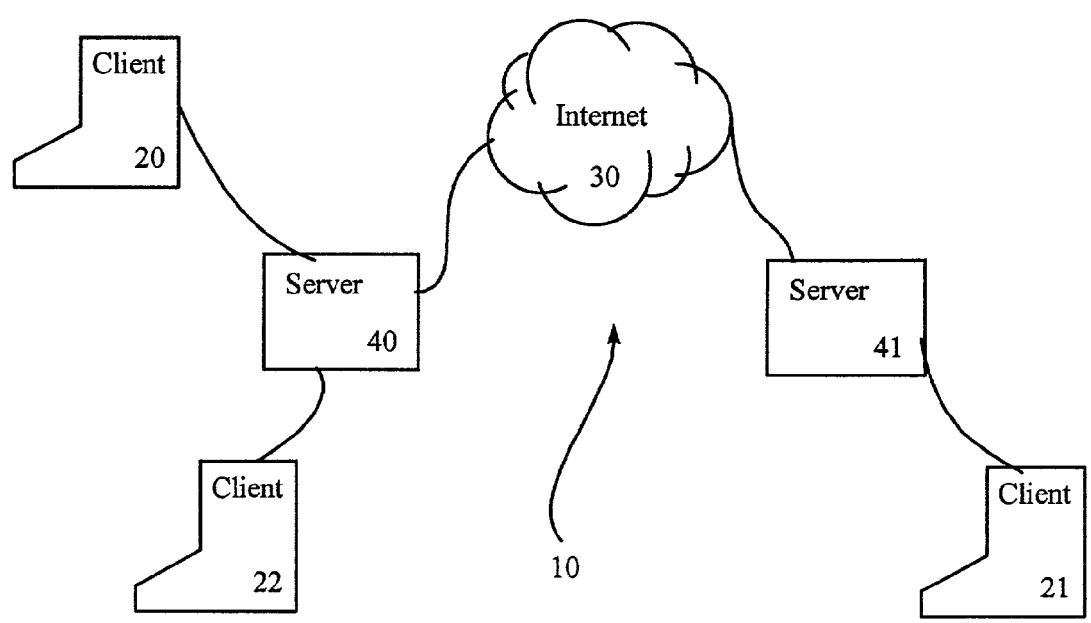
FIG. 3 depicts a computer network for verification of retrieved documents according to the present invention.

Described herein are self-verifying hyperlink references and methods of using such references for ensuring that the content of a referenced document is identical to the content of the referenced document when the reference was made in the originating document containing the hyperlink reference. As illustrated in FIG. 1, an electronic document 1, such as a web page, may include reference 2 to other electronic documents 3, 4, and 5, which may contain information such as text, images, charts, etc., e.g., which may supplement the content of the originating document 1. The activation of these references may retrieve the referenced documents and display them to the user, initiate downloading of the referenced document, etc. Referenced documents 3, 4, and 5 may be stored on the same server as the originating document 1, or on different servers, e.g., servers located across a network, such as the Internet. Described herein are hyperlinks, such as is schematically depicted in FIG. 2, designed to permit the verification and/or validation of the content of the retrieved document, e.g., to protect against undesirable alterations in the content. As shown for the network 10 of FIG. 3, such hyperlink references may be used to verify the contents of documents obtained by a client 20 from a local server 40, or from a foreign server 41 coupled to the local server 40 via the Internet 30.

As shown in FIG. 2, the self-verifying hyperlink 2 may include an address portion 7 representative of the location of the referenced document, such as a URL address, and a verification portion 8 which may include a portion of the referenced document or a value representative of all or a portion of the content of the referenced document. For example, in HTML, a hyperlink may be: <A HREF http://www.refdoc.com/refdoc VERIFY=(verification portion)>, wherein VERIFY is indicative of the function used to determine the verification portion and is represented in a manner suitable for execution by a web browser or other suitable interface. Similar hyperlinks may be constructed using XML, ASN.1, or any other suitable language or encoding scheme. Changes in the content may prevent the content from being displayed or send a warning or error message to the viewer, to an administrator of the originating document, or to another appropriate person or system. In this way, changes in the content of referenced documents can be monitored to prevent a hyperlink reference from retrieving an inappropriate or undesirable document.

In one embodiment, the verification portion includes a predetermined portion of the referenced document, such as the first twenty words, characters #212-245, every sixteenth character, or any other portion as desired. When the document is retrieved, for example, by a user operating a web browser with a computer, the predetermined portion of the retrieved document is compared to the verification portion of the hyperlink.

If the two portions are identical, the retrieved document may be displayed to the user. If the two portions differ, a message may be sent to the user, for example, indicating that the content of the document has been altered, or that the document cannot be displayed. In certain embodiments, the retrieved document, although altered, may be presented to the user. Furthermore, a message may be sent to the administrator, author, or maintainer of the originating document indicating that the content of the referenced document should be verified to determine whether significant changes have been made in the content of the referenced document. Such a message may include the address of the referenced document and/or the address of the originating document.

In certain embodiments, a self-verifying hyperlink may include a value representative of all or a portion of the referenced document instead of, or in addition to, the predetermined portion. Such a value may be the result of applying a predetermined formula to the contents of all or a portion of the referenced document. Exemplary formulas that may be applied in this fashion include hashing functions, such as MD2, SHA, SHA1 and MD5, although other suitable formulas and functions will be known to those of skill in the art. Because the calculated value for a given document is difficult to predict, the use of such formulas confers the additional advantage that manipulating a document to have a different content yet identical value is rendered difficult. Thus, intentional falsification of referenced documents is severely hampered by the use of such formulas and values.

In certain embodiments, the formula used to calculate the value may be capable of distinguishing a content of a document from its format. For example, the formula may calculate a single value for a span of text whether it is stored as an Adobe Acrobat file, an HTML file, a text file, or in any other format. In this way, the value calculated by the formula better represents the content of the document, and will not indicate a change of content merely because the format of the document has been altered. Similarly, the formula may consider substantive changes, such as changes in the text, while ignoring formatting changes, such as punctuation, margins, fonts, italics, etc., which do not substantially alter the meaning of the text.

In embodiments wherein the verification portion or value is representative of a predetermined portion of a referenced-document, the verification portion may be associated with or include terms indicative of the representative portion, so that the hyperlink may identify, review, and compare the predetermined portion of the referenced document. For example, in one embodiment, the verification portion may include information representative of the beginning of the representative portion and information representative of the length of the representative portion. In a different embodiment, the verification portion may be associated with information representative of the beginning of the representative portion and information representative of the end of the representative portion. Such information may be represented, for example, as XML, SGML, or HTML metatags.

In some embodiments, the verification portion may be digitally signed by the author, administrator, or other official or system associated with the originating document to ensure the accuracy and source of the verification portion of the hyperlink, e.g., by using a high assurance digital signature scheme, as is known in the art. Additionally or alternatively, the verification portion may be digitally signed by a recognized authority, such as a certifying authority to further protect the verification portion from unauthorized alteration or tampering. Either or both digital signatures may include a time stamp. A digitally signed verification portion may then be represented in a digital form and included in a hyperlink as discussed above. In certain embodiments, it may further be advantageous to digitally sign the originating document (or at least a portion thereof which contains the hyperlink), or to include a digitally signed verification portion for the content of the originating document in the hyperlink, to provide additional security for the hyperlink.

A self-verifying hyperlink may be created by providing an electronic document, such as a web page, accessible at an address and linking the address of the document to a verification portion representative of the contents of the document. The verification portion may include a portion of the electronic document or a value representative of all or a part of the electronic document as discussed above. The format and technique used to create the self-verifying hyperlink will vary with the language or encoding scheme used to create the hyperlink, but will be readily understood by one of skill in the art. In certain embodiments, the verification portion may be digitally signed or encrypted to protect against tampering or accidental alteration. In certain embodiments, the address is a URL address. The self-verifying hyperlink may be included in a web page.

A self-verifying hyperlink may be verified by an application, such as a web browser, word processor, electronic mail client, or a COTS application, including, for example, Netscape Navigator, Microsoft Internet Explorer, Adobe Acrobat, Microsoft Word, etc., by any technique which performs a verification function as described herein. For example, the application may be configured, e.g., by including suitable code, supplementing the code, providing a plug-in or helper application, applying a patch, etc., to implement the verification function as described herein. In one embodiment, a web browser can be configured with a verification plug-in which, upon activation of a self-verifying hyperlink, e.g., by right-clicking on the hyperlink, permits the user to deploy the verification function in addition to retrieving the referenced document.

Upon deploying the verification function, the application or associated software portion may authenticate the referenced document by unwrapping the verification portion within the hyperlink, validating the digital signature and notary (if appropriate), then retrieving the content of the referenced document or predetermined portion thereof. The retrieved content is compared to the verification portion, e.g. by applying a hashing algorithm such as SHA to the retrieved content and comparing the result with the verification portion embedded within the hyperlink. The user may then be notified of the authenticity or invalidity of the referenced document.

In yet another embodiment, a self-verifying hyperlink may include instructions, e.g., computer code stored on a non-transitory computer readable medium, such as Java applet or other application, for performing all or part of the verification process. Thus, the self-verifying hyperlink may thus include instructions for applying a formula, such as a hash function, to all or a predetermined portion of a referenced document. The hyperlink may further include instructions for comparing the result of applying the formula to the verification portion included in the hyperlink, to thereby determine whether the content of the referenced document has been altered. Thus, in certain embodiments, the calculations related to verification may be performed by the server or system which stores the originating document, or by the user's system, e.g., the client running a web browser, etc., depending on the instructions associated with or included in the self-verifying hyperlink.

Figure 4:
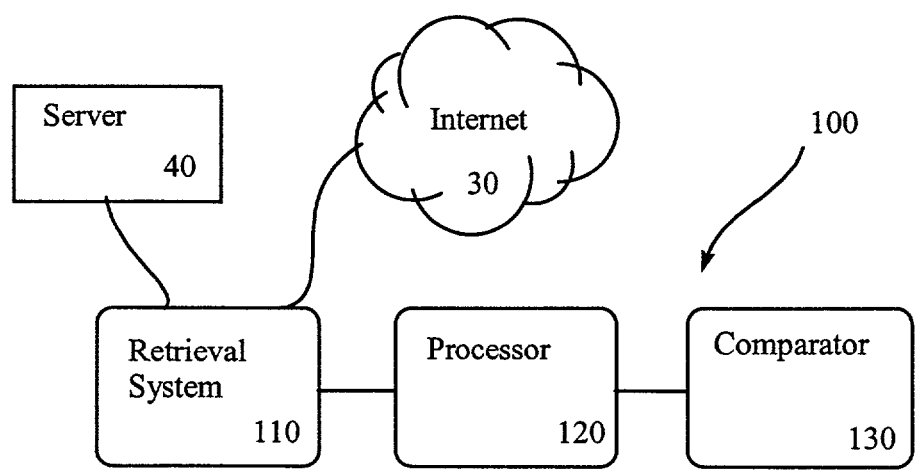
FIG. 4 shows a system useful for verifying the content of retrieved documents according to the present invention.

A system 100 for monitoring the content of an electronic document referenced by a hyperlink, as shown in FIG. 4, may thus include a retrieval system 110 for accessing an electronic document located at an address, such as a URL address, and a comparator 130 for comparing the content of the retrieved document with a verification portion representative of the contents of the referenced document associated with the address, e.g., a verification portion of a self-verifying hyperlink as described above. In certain embodiments, the system 100 may also include a processor 120 for performing calculations or computations on the retrieved document, for example, in embodiments wherein the verification portion includes a code such as a hash value. The various components described above may be implemented as software modules, and any or all of the above components may be merged into a single component capable of performing one or more of the above functions. Alternatively, any or all of the above components may be implemented as hardware devices. One of skill in the art will understand that such modifications and alternative systems are encompassed by the present disclosure.

A method 200 for verifying the content of a retrieved document is illustrated in FIG. 5. In the method, a user, for example, operating a web browser may view an originating page and activate a hyperlink as described above, for example, by clicking on it, to provide an address of an electronic document 210. The system may retrieve the document from the address 220 and compare the contents of the retrieved document to the verification portion 230. The method for performing the comparison will vary, depending on the method used to derive the verification value. For example, if the verification portion was derived by selecting a portion of the referenced document, an analogous portion of the retrieved document may be selected for comparison. If the verification portion is a value resulting from applying a formula or function to all or a portion of the contents of the referenced document, the same formula or function may be applied to the retrieved document or a portion thereof, as will be apparent to one of skill in the art. Suitable instructions for performing the comparison may be included in the self-verifying hyperlink.

If comparison of the retrieved document to the verification value indicates that the contents of the referenced document have not been changed, the document may be displayed to the user. If comparison indicates that changes have taken place, the system may provide a warning to the user and/or to a person associated with the originating page to indicate that the referenced document has been altered. In certain embodiments, the system may not display an altered document to the user.

While the invention has been disclosed in connection with the embodiments shown and described in detail, various equivalents, modifications, and improvements will be apparent to one of ordinary skill in the art from the above description. Such equivalents, modifications, and improvements are intended to be encompassed by the following claims.

I claim:

1. A method for creating a self-verifying hyperlink, comprising:
providing an electronic resource accessible at an address,
determining contents of a predetermined portion of the electronic resource at a predetermined time, and creating a hyperlink which includes:
the address of the electronic resource, and
a verification portion containing said contents, said verification portion being separately designated from the address so as to allow the address to remain unaltered if the electronic resource is modified, said verification portion being configured for use by a processor in comparing contents of said predetermined portion of said electronic resource at said predetermined time to contents of said predetermined portion of said electronic resource when said electronic resource is retrieved, so as to allow for preventing display of changed contents in said electronic resource.

2. A method as in claim 1, further comprising digitally signing a value representative of said contents of said predetermined portion of said electronic resource at said predetermined time.

3. A method as in claim 2, wherein creating a hyperlink includes coupling a URL address with the value.

4. A method as in claim 1, wherein the verification portion comprises a value expressed as an attribute of an HTML (HyperText Markup Language) tag.

5. A method as in claim 1, wherein the verification portion comprises a hash value based on a subset of the electronic document.

6. A method as in claim 1, wherein the verification portion comprises a hash of at least a portion of the electronic document.

7. A method as in claim 1, wherein the hyperlink further comprises instructions for determining a value representative of the contents of the electronic document.

8. A system for monitoring the contents of electronic resources, comprising:
a processor implemented by at least a hardware device;
a hyperlink having
an address for retrieving an electronic resource from a server, and
a verification portion including a predetermined subset of contents of a predetermined version of the electronic resource, said verification portion being separately designated from the address so as to allow the address to remain unaltered if the electronic resource is modified,
a retrieval system, executable by the processor, for obtaining a current version of the electronic resource at the address, and
a comparator, executable by the processor, for comparing the verification portion with the predetermined subset of contents of the current version to determine if the electronic resource has been modified, so as to allow for preventing display of changed contents in said electronic resource.

9. A system as in claim 8, further comprising a processor for calculating a value representative of the predetermined version, wherein the value is a digitally signed value.

10. A system as in claim 8, wherein the address is a URL address.

11. A system for verifying the contents of an electronic resource, comprising:
a processor implemented by at least a hardware device operable to execute:
means for identifying an address of an electronic resource coupled to a first value including a subset of content of the resource at a predetermined time, said first value being separately designated from the address so as to allow the address to remain unaltered if the electronic resource is modified,
means for retrieving the electronic resource,
means for generating a second value including a subset of the contents of the retrieved resource using a processor,
means for comparing the first value with the second value to determine if the resource has been altered since the predetermined time, and
means for preventing display of contents in said electronic resource if the resource has been altered.

12. A method for verifying the contents of an electronic document, comprising:
providing an address for retrieving an electronic document coupled to a value containing, at least in part, a predetermined subset of the contents of the electronic documents at a predetermined time, said value being separately designated from the address so as to allow the address to remain unaltered if the electronic document is modified,
retrieving the electronic document from the address,
determining a value using a processor containing, at least in part, the predetermined subset of the contents of the retrieved document,
comparing the determined value with the value containing, at least the predetermined subset of the contents of the electronic document at the predetermined time to determine if the document has been modified since the predetermined time,
preventing display of contents of said electronic document if the document has been modified.

13. A method as in claim 12, wherein providing an address includes providing a URL address.

14. A method as in claim 12, wherein providing an address includes providing an address for retrieving an electronic document coupled to a digitally signed value representative of the contents of the electronic document at a predetermined time.

15. A method as in claim 12, wherein determining the value comprises determining a hash of at least a portion of the electronic document.

16. A method as in claim 12, further comprising providing an indication if the document has been modified.

17. A system for verifying the contents of an electronic document, comprising:
an address of an electronic document,
a first value representative of the contents of said electronic document at a predetermined time, said value including contents located at predetermined locations in said electronic document, said value being separately designated from the address so as to allow the address to remain unaltered if the electronic document is modified,
a retrieval system for obtaining an electronic document stored at the address,
a processor implemented by at least a hardware device for determining a second value representative of the retrieved document, said second value including contents location at predetermined locations in said retrieved document, and
a comparator for comparing the second value representative of the retrieved document with the first value representative of a document previously retrieved from the address to verify that the values are identical, so as to allow for preventing display of changed contents in said electronic document.

18. A system of claim 17, wherein the processor further calculates a hash of at least a portion of the electronic document.

19. A system of claim 17, wherein the value representative of the retrieved document comprises a value include in an hypertext link.

20. A system of claim 19, wherein the hypertext link comprises an HTML (HyperText Markup Language) link, and wherein the value comprises an attribute of an HTML tag.

21. A system as in claim 19, wherein the hypertext link further comprises instructions for determining a value representative of the contents of the electronic document.

22. A non-transitory computer readable medium, for verifying electronic content referenced by a web-page, the non-transitory computer readable medium comprising instructions for causing a processor to:
receive information included in a hyperlink with a web-page, the hyperlink including an address of electronic content stored on a first remote network computer and a verification portion having a first value derived from said electronic content, said verification portion being separately designated from the address so as to allow the address to remain unaltered if the electronic document is modified, said first value including data at predetermined locations in said electronic content at a predetermined time, whereby the verification portion can be used to compare data at said predetermined locations in said electronic content at the predetermined time to data at said predetermined locations in said electronic content at a time when the electronic content is retrieved;
derive a second value including data at the predetermined locations in electronic content retrieved from the address using a processor;
determine whether the first value equals the second value; and
provide notification of content modification and prevent display of the electronic content if the first value does not equal the second value when the electronic content is retrieved from the first remote network.

23. A non-transitory computer readable medium of claim 22, wherein the first value included in the hyperlink comprises an attribute of an HTML (HyperText Markup Language) tag.

24. A non-transitory computer readable medium of claim 22, wherein the instructions for causing the processor to derive the second value comprises instructions for causing the processor to use a hash function on at least a portion of the electronic content.

25. A non-transitory computer readable medium of claim 22, wherein the instructions for causing a processor to provide notification comprise instructions for displaying a message to a user.

26. A non-transitory computer readable medium of claim 22, further comprising instructions for causing the processor to retrieve the electronic content.

27. A non-transitory computer readable medium of claim 26, further comprising instructions for causing the processor to retrieve the web-page.

28. A non-transitory computer readable medium of claim 22,
wherein the hyperlink includes instructions for determining a value representative of the contents of the electronic document; and
wherein deriving the second value comprises deriving a second value using the included instructions.

* * * * *